United States Patent
Klenk et al.

[11] Patent Number: 6,098,589
[45] Date of Patent: Aug. 8, 2000

[54] DIRECT-INJECTED FOUR-CYCLE INTERNAL COMBUSTION ENGINE AND METHOD OF OPERATING SAME

[75] Inventors: Rolf Klenk, Stuttgart; Klaus Roessler, Altbach, both of Germany

[73] Assignee: Daimler-Benz Aktiengesellschaft, Stuttgart, Germany

[21] Appl. No.: 09/188,174

[22] Filed: Nov. 3, 1998

[30] Foreign Application Priority Data

Nov. 7, 1997 [DE] Germany ................ 197 49 295

[51] Int. Cl.$^7$ .................. F02B 17/00; F02B 23/10
[52] U.S. Cl. .................. 123/295; 123/298; 123/305
[58] Field of Search .................. 123/275, 295, 123/298, 305

[56] References Cited

U.S. PATENT DOCUMENTS

| | | | |
|---|---|---|---|
| 4,187,825 | 2/1980 | Loyd, Jr. ............... | 123/295 X |
| 4,574,754 | 3/1986 | Rhoades, Jr. ............... | 123/298 |
| 4,920,937 | 5/1990 | Sasaki et al. ............... | 123/298 X |
| 5,335,635 | 8/1994 | Kadoi et al. ............... | 123/298 X |
| 5,724,937 | 3/1998 | Bezner et al. ............... | 123/275 |
| 5,927,244 | 7/1999 | Yamauchi et al. ............... | 123/298 X |

*Primary Examiner*—Tony M. Argenbright
*Attorney, Agent, or Firm*—Evenson, McKeown, Edwards & Lenahan P.L.L.C.

[57] ABSTRACT

Direct-injected, four-cycle internal combustion engines can be operated advantageously with charge stratification, with the fuel being injected into the combustion chamber during the compression stroke of the piston in the cylinder as a conical fuel stream. To ignite the stratified mixture cloud, an igniting spark jumps between the electrodes of a spark plug and thus contacts an ignitable mixture. In order to guarantee sufficient preparation and stable ignition and combustion of the fuel/air mixture in the long term, it is proposed that the electrodes be located outside a conical jacket of the fuel stream and that the combustion chamber roof be so designed that the conical jacket is formed during injection between the injector and the spark plug close to the wall of the combustion chamber roof. The mixture guided in the conical jacket is deflected outward in the direction of the electrodes as a result.

20 Claims, 2 Drawing Sheets

DIRECT-INJECTED FOUR-CYCLE INTERNAL COMBUSTION ENGINE AND METHOD OF OPERATING SAME

BACKGROUND AND SUMMARY OF THE INVENTION

This application claims the priority of German application 197 49 295.9, filed in Germany on Nov. 7, 1997, the disclosure of which is expressly incorporated by reference herein.

The invention relates to a direct-injected four-cycle internal combustion engine. Especially preferred embodiments relate to a direct-injected, four-cycle internal combustion engine with at least one cylinder, in which a combustion chamber is delimited by a piston, movable lengthwise in a respective cylinder, and a combustion chamber roof is formed by an interior of a cylinder head, with one injector per cylinder for injecting a conical fuel stream into the combustion chamber, with a fuel/air mixture being formed with combustion air supplied separately, said mixture being ignited by an igniting spark jumping between electrodes of a spark plug.

The internal mixture formation of the fuel sprayed into the injection chamber with combustion air supplied separately allows stratified charge operation, which achieves a significant reduction in fuel consumption by comparison with other known mixture formation methods over broad partial load ranges of the engine. The stratified combustion chamber charge is produced by injecting fuel during the compression stroke of the piston, with an inhomogeneous stratified mixture with a high fuel concentration in the vicinity of the fuel stream forming during the short interval for mixture preparation between the injection of the fuel and the ignition of the mixture. Hence, the combustion chamber contains areas of ignitable fuel/air mixture in the form of mixture clouds around which the mixture ratios become increasingly lean so that the four-cycle internal combustion engine can be operated with surplus air. A stable charge stratification that permits extensive de-throttling in the partial load range and even throttle-free operation during idle, is achieved by injecting a conical stream of fuel, with the injector being equipped with a suitable injection nozzle.

The mixture cloud is ignited by an igniting spark that jumps between the electrodes of a spark plug. The ignition of the stable stratified charge with surplus air often is achieved with a spark plug located immediately adjacent to the injector, ensuring that an ignitable, i.e. fuel-rich mixture will be contacted by the igniting spark.

A four-cycle internal combustion engine of this type is already known from German Patent Document DE 43 24 642 A1. The ignition and burning of the mixture takes place during stratified charge operation soon after fuel injection ends and before an increasing homogenization of the stratified mixture takes place, and the ignitable mixture cloud advances in the direction of the fuel stream away from the electrodes located near the injectors. The electrodes of the spark plug in the known arrangement extend deep into the combustion chamber and into the interior of the conical fuel stream that is produced during injection. The electrodes are wetted with fuel during injection which cannot fully evaporate before ignition occurs, causing deposits on the electrodes during the combustion process. The increasing coking of the electrodes causes surface discharges and thus misfiring, and the spark plug rapidly becomes nonfunctional. In addition, with a "stream-guided" direct-injection concept of this kind, in which the fuel is delivered to the electrodes near the injector by the movement of the flow in the fuel stream, only a short time interval is available for preparing the mixture before ignition, so that soot deposits caused by incomplete fuel combustion due to insufficient mixture preparation can frequently be seen.

German Patent Document DE 195 46 945 A1 teaches a direct-injected four-cycle internal combustion engine in which the electrodes of the spark plug are located outside the conical jacket of the fuel stream and therefore are not wetted with fuel during injection, so that coking is prevented. The roof of the combustion chamber is designed to be roughly conical and extends at a distance parallel to the conical jacket. Through the air gap formed between the fuel cone and the roof of the combustion chamber, an air stream which was previously displaced by the injection stream is intended to flow backwards against the flow direction for reasons of continuity and to trigger a vortical flow which entrains fuel droplets or a mixture from the conical jacket and transports it to the electrodes. The flow-mechanical design of the mixing vortex into which the electrodes must extend, however, cannot be controlled. With a limited vortex strength in the vicinity of the spark plug, it is not possible to remove enough fuel from the conical jacket to bring a mixture capable of igniting between the electrodes. Misfires are the unavoidable result.

A goal of the present invention is to design the internal combustion engine according to the species in such fashion that sufficient preparation as well as stable ignition and combustion of the fuel/air mixture are reliably guaranteed during stratified charge operation.

This goal is achieved according to certain preferred embodiments of the invention by a direct-injected four-cycle internal combustion engine of the above referred to type, wherei the electrodes are located outside the conical jacket of fuel streams, and wherein the combustion chamber roof is so designed that the conical jacket is formed during injection in a portion that extends between the injector and the spark plug immediately adjacent to a wall of the combustion chamber roof.

The design of the combustion chamber roof according to the invention makes it possible to supply a fuel-rich mixture despite the electrodes being located away from the conical jacket. The fact that the conical jacket is so close to the wall of the combustion chamber roof causes an outwardly directed deflection of the fuel droplets guided in the conical jacket. The spreading of the fuel stream is influenced by the laterally close combustion chamber wall, with a vacuum developing at the fuel chamber wall that attracts the flow layers of the conical jacket. This phenomenon of deflection of a flow formed adjacent to a solid is termed the Coanda effect, which permits the transport of ignitable mixtures to the spark plug by simple means. Due to the extent of the conical jacket length in the generating line direction and the width of the stream area that is guided close to the wall of the roof of the combustion chamber, the degree of deflection in the direction of the electrodes of the spark plug can be varied. By utilizing the Coanda effect, the distance between the injector and the electrodes can be increased so that before ignition takes place, sufficient mixture preparation takes place and soot formation is reliably avoided.

Advantageously, a guide rib rises between the injector and the spark plug, running approximately parallel to the generating line of the conical jacket, said rib causing the radial deflection of the conical jacket toward the spark plug and not reducing the combustion chamber volume at all.

The guide rib can extend as far as a receiving opening of the spark plug in the roof of the combustion chamber, reinforcing the deflection caused by the Coanda effect. If the electrodes are located in the mouth area of the receiving opening of the spark plug, they are reliably protected against being wetted by the fuel by the soffit of the guide rib.

Other objects, advantages and novel features of the present invention will become apparent from the following detailed description of the invention when considered in conjunction with the accompanying drawings.

DETAILED DESCRIPTION OF THE DRAWINGS

Figure 1:
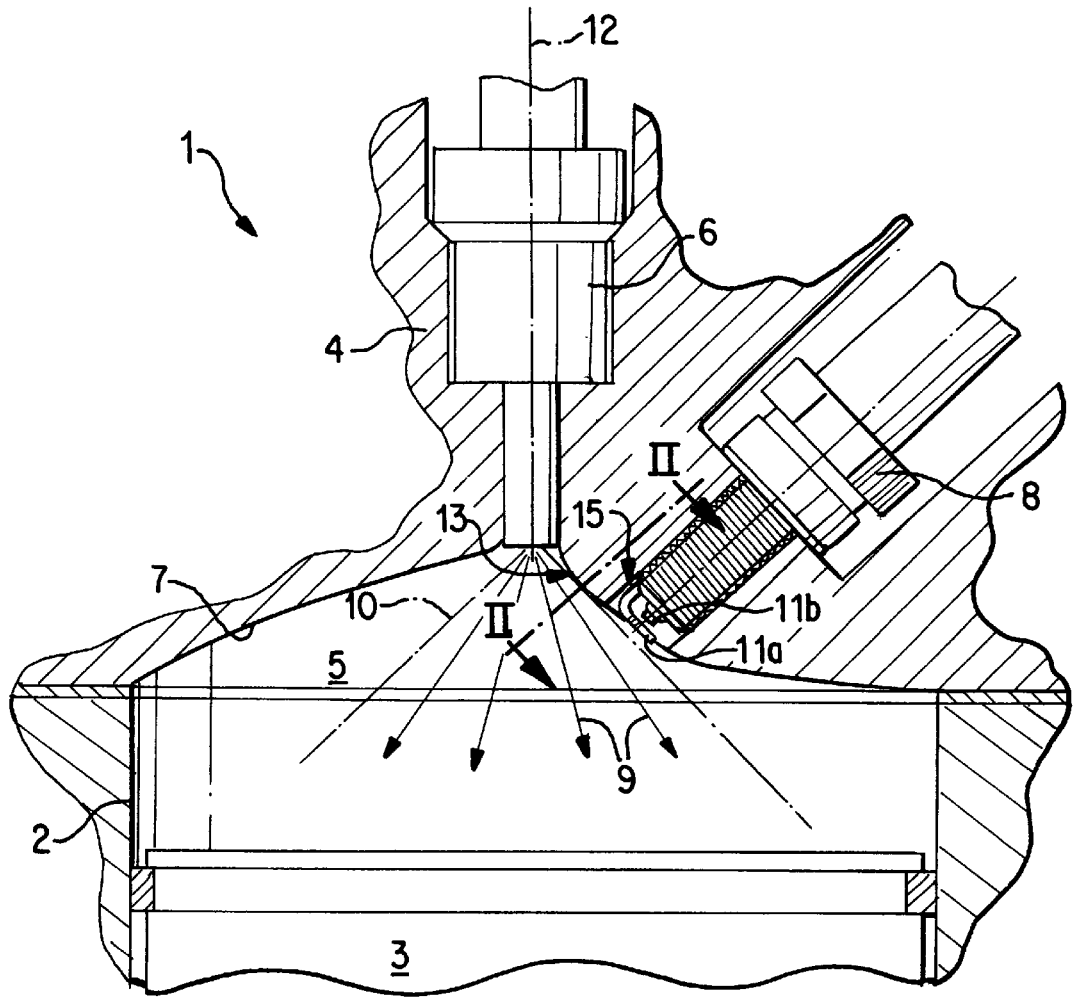
FIG. 1 is a lengthwise section through the combustion chamber of a direct-injected four-cycle internal combustion engine, constructed according to a preferred embodiment of the invention.

FIG. 1 shows a cylinder 2 of a direct-injected, four-cycle internal combustion engine 1 in which a piston 3 is disposed that is movable lengthwise. Piston 3, with a combustion chamber roof 7 formed by the interior of a cylinder head 4, delimits a combustion chamber 5 in cylinder 2. Combustion chamber roof 7 is made funnel-shaped, with the peak of combustion chamber roof 7 being located centrally in cylinder 2. In the peak of combustion chamber roof 7, an injector 6 is provided that injects a conical fuel stream 9 into combustion chamber 5 for internal mixture formation with combustion air supplied separately.

Fuel stream 9 expands toward piston 3, directed symmetrically to a cylinder axis 12 during stratified charge operation of internal combustion engine 1, with the fuel being injected during the compression stroke of piston 3. In combustion chamber 5, in accordance with the conical shape of injection stream 9, a central mixture cloud forms containing fuel-rich ignitable fuel/air mixture. In the radial direction, the mixture ratio of the mixture cloud becomes increasingly lean. The funnel-shaped combustion chamber roof 7 is located far away from the conical jacket 10 of fuel stream 9 and allows a free spread of fuel stream 9, so that stable stratification during mixture formation is favored.

The mixture is ignited by an igniting spark which jumps between electrodes 11a and 11b of a spark plug 8. The electrodes 11a and 11b therefore are located outside conical jacket 10. In order to transport ignitable fuel/air mixture to electrodes 11a, 11b, the roof of the combustion chamber is so designed that conical jacket 10 is formed during injection in a portion that extends between injector 6 and the electrodes of spark plug 8 immediately adjacent to the wall of combustion chamber roof 7.

The formation of the conical jacket near the wall in the portion of the combustion chamber roof located between injector 6 and spark plug 8 is achieved by virtue of the fact that a guide rib 13 rises from the affected section of combustion chamber roof 7, said rib running approximately parallel to the generating line of conical jacket 10. The vacuum that develops close to guide rib 13 because of the Coanda effect attracts the fuel-rich mixture flow guided in the conical jacket. The deflection, caused by the guide rib, of the fuel that is flowing in the direction of a generating line of conical beam 10 brings an ignitable mixture between electrodes 11a, 11b of spark plug 8. Although electrodes 11a, 11b are located geometrically outside conical jacket 10 and are therefore not struck by fuel stream 9 and wetted with fuel, during stratified charge operation of internal combustion engine 1 an ignitable mixture is contacted by the igniting spark and reliable burning of the mixture cloud in combustion chamber 5 is achieved.

Guide rib 13 extends up to a receiving opening 15 of spark plug 8 in combustion chamber roof 7, so that the Coanda effect forces the deflected mixture flow into the mouth area of receiving opening 15. The soffit of guide rib 13 forms an ignition chamber in the mouth portion of receiving opening 15 in which the deflected mixture is ignited and the combustion chamber charge catches fire on a broad front. Electrodes 11a, 11b are located approximately at the level of the surface of guide rib 13 and are protected by the soffit against injection with liquid fuel. Spark plug 8 advantageously can be so designed that its axial extent, which determines the sparking distance between electrodes 11a, 11b is located approximately perpendicularly to conical jacket 10 of fuel stream 9.

Figure 2:
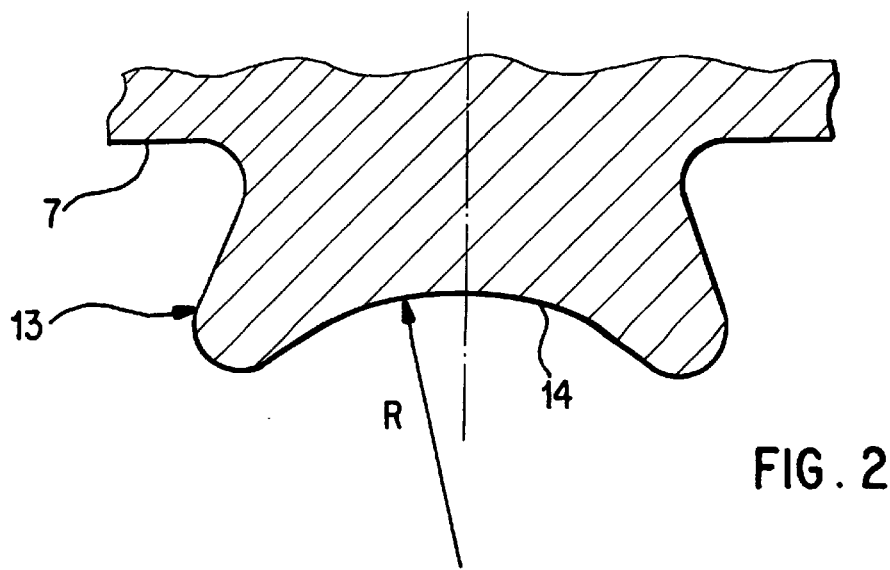
FIG. 2 shows the guide rib formed by the roof of the combustion chamber, in a section along line II—II in FIG. 1.

In a section along line II—II in FIG. 1, FIG. 2 shows the profile of guide rib 13 which favors the deflection according to the invention of the fuel flows of the conical jacket to the electrodes. The guide rib 13 that rises from combustion chamber wall 7 is provided with a groove 14 that extends over the width of guide rib 13. Groove 14 forms the surface of guide rib 13 that has a deflecting effect on the injected fuel cone. It is in the shape of a circular section and therefore includes the conical jacket of the fuel stream in the jacket portion to be influenced by using the Coanda effect, between the injector and the electrodes of the spark plug. The radius R of groove 14 is then made concentric with respect to the fuel stream. During fuel injection, guide rib 13 is therefore located close to the fuel cone over a sufficient width.

The strength of the suction and deflection effect produced on the conical stream by the Coanda effect is capable of being varied by varying both the length and width of guide rib 13, i.e. the arc angle formed by groove 14 which surrounds the conical stream. By a suitable choice of the length of rib 13 and/or its width (circumferential angle of groove 14) during the shaping of guide rib 13, there are a number of ways to influence conical stream 9 with the aid of the Coanda effect. The positioning possibilities for the electrodes of the spark plug are considerably expanded. The free choice of the spark position in the combustion chamber creates optimum operating conditions as far as mixture preparation and mixture burning and combustion are concerned, whose respective requirements regarding the spatial arrangement of the injector and the spark plug relative to one another are partially in opposition to one another. Both a spark position close to the injector and one that is remote from the injector are possible, with the electrodes of the spark plug being basically located outside the conical jacket and therefore projected against coking.

Figure 3:
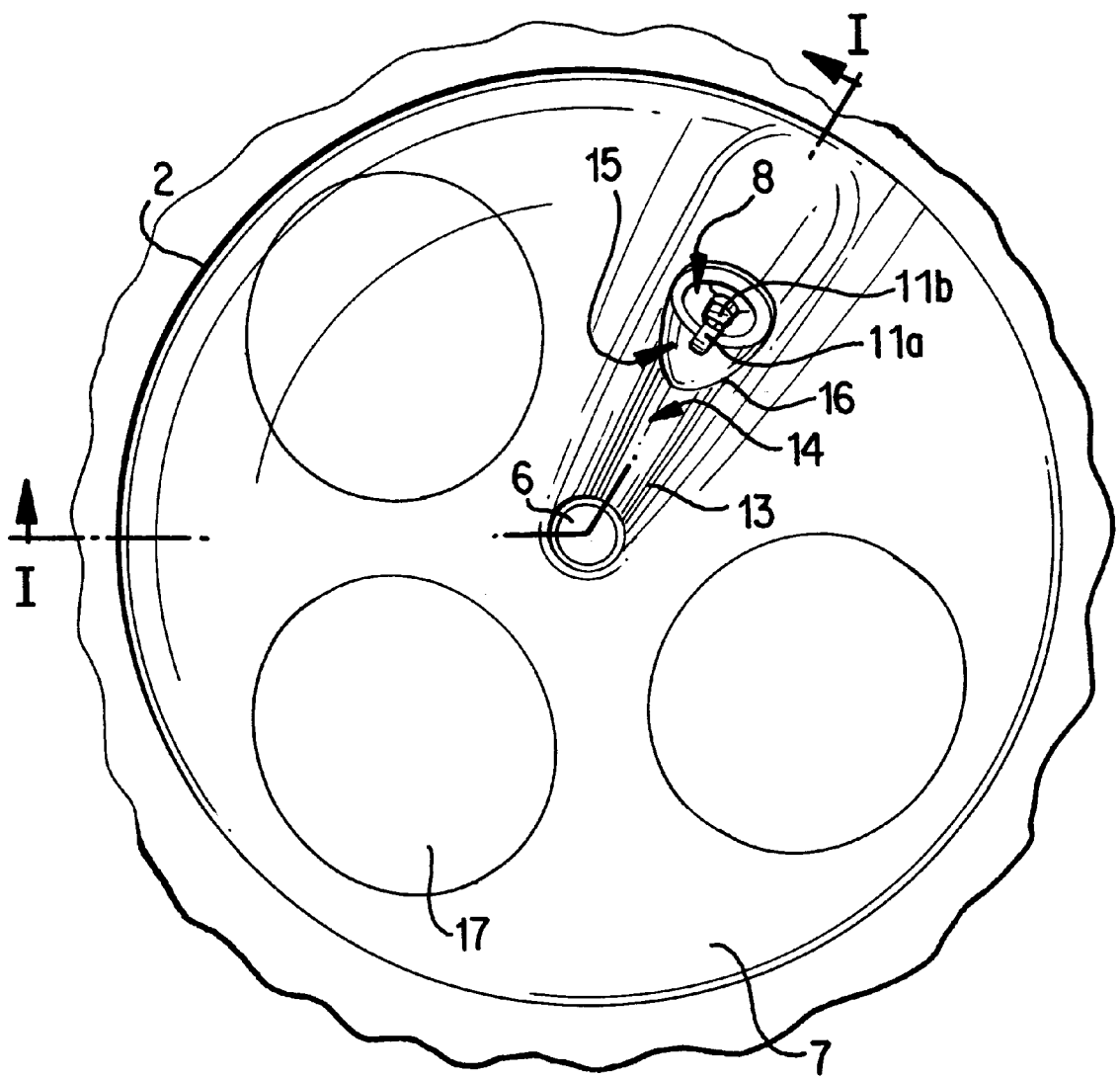
FIG. 3 is a top view of the cylinder head according to FIG. 1 as viewed from the combustion chamber.

FIG. 3 shows a top view of combustion chamber roof 7 that is made funnel-shaped in the cylinder head, from which guide rib 13 rises in the radial direction. Starting at injector 6, guide rib 13 extends over the receiving opening 15 designed in the cylinder head for the spark plug up to a point close to the wall of cylinder 2. The portion of guide rib 13 that acts on the fuel cone between injector 6 and spark plug 8 rises higher than the portion that is located radially behind receiving opening 15, clearly evident from FIG. 1 as a section along line I—I of FIG. 3. The radial position of spark plug 8 in combustion chamber roof 7 and/or the position of electrodes 11a, 11b significantly influences the combustion process in the combustion chamber. It may be selected freely on the basis of the design of guide rib 13 according to the invention and the effect produced thereby, so that the possibility of reducing consumption which direct injection with stratified charge operation theoretically offers can be better utilized.

In the circumferential direction of combustion chamber roof 7, receiving opening 15 of spark plug 8 is located approximately centrally in the vicinity of guide rib 13. Electrodes 11a, 11b are located in the installation position of spark plug 8 in the mouth area 16 of receiving opening 15 and thus are located approximately at the level of the bottom of groove 14 formed on guide rib 13. Because of the arcuate design of groove 14 and the inclined position of the spark plug relative to the cylinder axis, the edge of receiving opening 15 formed in mouth area 16 extends in the direction of injector 6. The inward flow of the fuel/air mixture deflected by the Coanda effect into the ignition chamber in mouth area 16 and transport between electrodes 11a, 11b is thus facilitated.

The design of combustion chamber roof 7 according to the invention for influencing the conical stream from injector 6 and for transporting an ignitable mixture to spark plug 8 can be used in a four-cycle internal combustion engine independently of the position of charge-changing valves 17 in combustion chamber roof 7. The flowrate in the mixture cone and/or the mixture cloud formed centrally during stratified charge operation is determined essentially by the fuel stream that is injected at high pressure. The conical stream is influenced by the Coanda effect independently of the selected mixture formation concept and the flow directions of the combustion air on entering the combustion chamber.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Direct-injected, four-cycle internal combustion engine with at least one cylinder, in which a combustion chamber is delimited by a piston, movable lengthwise in a respective cylinder, and a combustion chamber roof is formed by an interior of a cylinder head, with one injector per cylinder for injecting a conical jacket of fuel streams into the combustion chamber, with a fuel/air mixture being formed with combustion air supplied separately, said mixture being ignited by an igniting spark jumping between electrodes of a spark plug, with the electrodes being located outside the conical jacket of fuel streams, wherein the combustion chamber roof is so designed that the conical jacket is formed during injection in a portion that extends between the injector and the spark plug immediately adjacent to a wall of the combustion chamber roof.

2. Internal combustion engine according to claim 1, wherein a guide rib extends from the fuel chamber roof between the injector and the spark plug and runs approximately parallel to the generating line of the conical jacket.

3. Internal combustion engine according to claim 2, wherein the guide rib extends up to a mouth of a receiving opening for the spark plug that is formed in the cylinder head.

4. Internal combustion engine according to claim 2, wherein the guide rib is provided with a round groove.

5. Internal combustion engine according to claim 3, wherein the guide rib is provided with a round groove.

6. Internal combustion engine according to claim 4, wherein the radius of the groove is made concentric with respect to the fuel stream.

7. Internal combustion engine according to claim 5, wherein the radius of the groove is made concentric with respect to the fuel stream.

8. Internal combustion engine according to claim 3, wherein the electrodes of the spark plug are disposed in a vicinity of the mouth of the receiving opening.

9. Internal combustion engine according to claim 4, wherein the electrodes of the spark plug are disposed in a vicinity of a mouth of the receiving opening.

10. Internal combustion engine according to claim 6, wherein the electrodes of the spark plug are disposed in a vicinity of a mouth of the receiving opening.

11. Internal combustion engine according to claim 1, wherein the combustion chamber roof is made funnel-shaped and the injector is located in a peak of the combustion chamber roof.

12. Internal combustion engine according to claim 7, wherein the peak of the combustion chamber roof is located centrally.

13. Internal combustion engine according to claim 2, wherein the combustion chamber roof is made funnel-shaped and the injector is located in a peak of the combustion chamber roof.

14. Internal combustion engine according to claim 4, wherein the combustion chamber roof is made funnel-shaped and the injector is located in a peak of the combustion chamber roof.

15. Internal combustion engine according to claim 6, wherein the combustion chamber roof is made funnel-shaped and the injector is located in a peak of the combustion chamber roof.

16. Internal combustion engine according to claim 8, wherein the combustion chamber roof is made funnel-shaped and the injector is located in a peak of the combustion chamber roof.

17. Direct-injected, four-cycle internal combustion engine with at least one cylinder, in which a combustion chamber is delimited by a piston, movable lengthwise in a respective cylinder, and a combustion chamber roof is formed by an interior of a cylinder head, with one injector per cylinder for injecting a conical jacket of fuel streams into the combustion chamber, with a fuel/air mixture being formed with combustion air supplied separately, said mixture being ignited by an igniting spark jumping between electrodes of a spark plug, with the electrodes being located outside the conical jacket of fuel streams, wherein means are provided for inducing a Coanda effect deflection of flow of a portion of said fuel streams outside of said conical jacket to electrodes of the spark plug to facilitate ignition.

18. Direct-injected, four-cycle internal combustion engine according to claim 17, wherein said means includes a guide rib which is asymmetrically disposed on the roof.

19. A method of operating a direct-injected, four-cycle internal combustion engine with at least one cylinder, in which a combustion chamber is delimited by a piston, movable lengthwise in a respective cylinder, and a combustion chamber roof is formed by an interior of a cylinder head, and with a spark plug having electrodes, said method comprising:

injecting a conical jacket of fuel streams into the combustion chamber, with a fuel/air mixture being formed with combustion air supplied separately, and igniting said mixture by an igniting spark jumping between electrodes of the spark plug, with the electrodes being located outside the conical jacket of fuel streams, and inducing a Coanda effect deflection of flow of a portion of said fuel streams outside of said conical jacket to electrodes of the spark plug to facilitate ignition.

20. A method according to claim 19, wherein said inducing includes guiding a portion of said fuel streams along a guide rib which is asymmetrically disposed on the roof.

* * * * *